US010395325B2

(12) United States Patent
Takuma et al.

(10) Patent No.: US 10,395,325 B2
(45) Date of Patent: Aug. 27, 2019

(54) LEGAL DOCUMENT SEARCH BASED ON LEGAL SIMILARITY

(71) Applicant: INTERNATIONAL BUSINESS MACHINES CORPORATION, Armonk, NY (US)

(72) Inventors: Daisuke Takuma, Tokyo-to (JP); Katsumasa Yoshikawa, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 959 days.

(21) Appl. No.: 14/938,041

(22) Filed: Nov. 11, 2015

(65) Prior Publication Data

US 2017/0132730 A1    May 11, 2017

(51) Int. Cl.
*G06Q 50/18* (2012.01)
*G06F 16/26* (2019.01)
*G06F 16/93* (2019.01)
*G06F 16/2457* (2019.01)

(52) U.S. Cl.
CPC ....... *G06Q 50/18* (2013.01); *G06F 16/24578* (2019.01); *G06F 16/26* (2019.01); *G06F 16/93* (2019.01)

(58) Field of Classification Search
CPC ............. G06Q 50/18; G06N 17/30011; G06N 17/3053; G06N 17/30572; G06N 5/00
USPC .......................................................... 706/45
See application file for complete search history.

(56) References Cited

U.S. PATENT DOCUMENTS

| 6,502,081 | B1 | 12/2002 | Wiltshire, Jr. et al. |
| 2005/0203899 | A1* | 9/2005 | Anderson .............. G06Q 50/18 |
| 2008/0027925 | A1* | 1/2008 | Li ...................... G06F 17/30864 |
| 2011/0145262 | A1* | 6/2011 | Jamjoom .......... G06F 17/30958 |
| | | | 707/748 |
| 2011/0258227 | A1 | 10/2011 | Lacasse |

(Continued)

FOREIGN PATENT DOCUMENTS

WO    2007009054    1/2007

OTHER PUBLICATIONS

Hammouda et al., "Document Similarity Using a Phrase Indexing Graph Model", Knowledge and Information Systems, 2004. (Year: 2004).*

(Continued)

*Primary Examiner* — Dave Misir
(74) *Attorney, Agent, or Firm* — Tutunjian & Bitetto, P.C.; Vazken Alexanian

(57) ABSTRACT

A method and system are provided for performing a legal document search. The method includes finding, by a processor, for each of a plurality of documents, a respective law clause related thereto, to obtain a plurality of related law clauses. The method further includes constructing, by the processor, a graph having nodes defined by the plurality of documents and the plurality of related law clauses and having edges defined by (1) relations between the plurality of documents and the plurality of related law clauses and (2) relations between the plurality of documents. The method further includes identifying, by the processor, from the plurality of documents, one or more candidate documents that are similar to an input query document by mining the graph using similarity criteria.

19 Claims, 5 Drawing Sheets

(56) References Cited

U.S. PATENT DOCUMENTS

2011/0270851 A1* 11/2011 Mishina ............ G06F 17/30958
　　　　　　　　　　　　　　　　　　　　　　707/749
2012/0149470 A1*  6/2012 Dasdan ............. G06F 17/30864
　　　　　　　　　　　　　　　　　　　　　　463/40
2012/0323880 A9  12/2012 Al-Kofahi et al.
2016/0042054 A1*  2/2016 Lu .................... G06F 17/30722
　　　　　　　　　　　　　　　　　　　　　　707/738

OTHER PUBLICATIONS

Firdhous, et al., "Automating Legal Research Through Data Mining", (IACSA) International Journal of Advanced Computer Science and Applications, Dec. 2010, pp. 9-16, vol. 1, No. 6.

Klein, et al., "Thesaurus-based Retrieval of Case Law", Proceedings of the 2006 conference on Legal Knowledge and Information Systems: JURIX 2006: The Nineteenth Annual Conference, Dec. 2006, 10 pages.

Schweighofer, et al., Improvement of Vector Representations of Legal Documents with Legal Ontologies, Institute of Public International Law; University of Vienna; Research Center for Computers and Law, Aug. 2002, 6 pages.

A Legal Relevance Ranking Function, available at: blog.tomtebo.org/wp-content/uploads/2011/09/thesis-split-4, pp. 70-75.

TREC Legal Track, Last modified: Thu May 10 23:11:35 2012, http://trec-legal.umiacs.umd.edu/, 8 pages.

* cited by examiner

LEGAL DOCUMENT SEARCH BASED ON LEGAL SIMILARITY

BACKGROUND

Technical Field

The present invention relates generally to information processing and, in particular, to a legal document search based on legal similarity.

Description of the Related Art

A similarity search is a core technology for legal document processing. Such legal document processing can be implicated, for example, in preparing a lawsuit, reviewing contracts, legal study, and so forth. However, pure Natural Language Processing (NLP) is not sufficient to handle this task since legal similarity is often different from document similarity. Thus, there is a need for a mechanism for performing a legal document search based on legal similarity.

SUMMARY

According to an aspect of the present principles, a method is provided for performing a legal document search. The method includes finding, by a processor, for each of a plurality of documents, a respective law clause related thereto, to obtain a plurality of related law clauses. The method further includes constructing, by the processor, a graph having nodes defined by the plurality of documents and the plurality of related law clauses and having edges defined by (1) relations between the plurality of documents and the plurality of related law clauses and (2) relations between the plurality of documents. The method further includes identifying, by the processor, from the plurality of documents, one or more candidate documents that are similar to an input query document by mining the graph using similarity criteria.

According to another aspect of the present principles, a computer program product is provided for performing a legal document search. The computer program product includes a computer readable storage medium having program instructions embodied therewith. The program instructions are executable by a computer to cause the computer to perform a method. The method includes finding, by a processor, for each of a plurality of documents, a respective law clause related thereto, to obtain a plurality of related law clauses. The method further includes constructing, by the processor, a graph having nodes defined by the plurality of documents and the plurality of related law clauses and having edges defined by relations between (1) the plurality of documents and the plurality of related law clauses and (2) the plurality of documents. The method also includes identifying, by the processor, from the plurality of documents, one or more candidate documents that are similar to an input query document by mining the graph using similarity criteria.

According to yet another aspect of the present principles, a system is provided for performing a legal document search. The system includes a hardware processor and a memory device, configured to find, for each of a plurality of documents, a respective law clause related thereto, to obtain a plurality of related law clauses. The hardware processor and the memory device are further configured to construct a graph having nodes defined by the plurality of documents and the plurality of related law clauses and having edges defined by (1) relations between the plurality of documents and the plurality of related law clauses and (2) relations between the plurality of documents. The hardware processor and the memory are also configured to identify, from the plurality of documents, one or more candidate documents that are similar to an input query document by mining the graph using similarity criteria. The system further includes a transmission server for transmitting, over one or more networks, the one or more candidate documents to a remote computing device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to a legal document search based on legal similarity. Advantageously, the present principles produce a solution to bridge the gap between legal similarity and document similarity.

Thus, in an embodiment, the present principles measure "legal similarity" rather than document similarity. For example, in an embodiment, the following and/or similar measures, can be employed: linguistically very close but not similar on legal standpoints; and linguistically not similar but legally similar.

Figure 1:
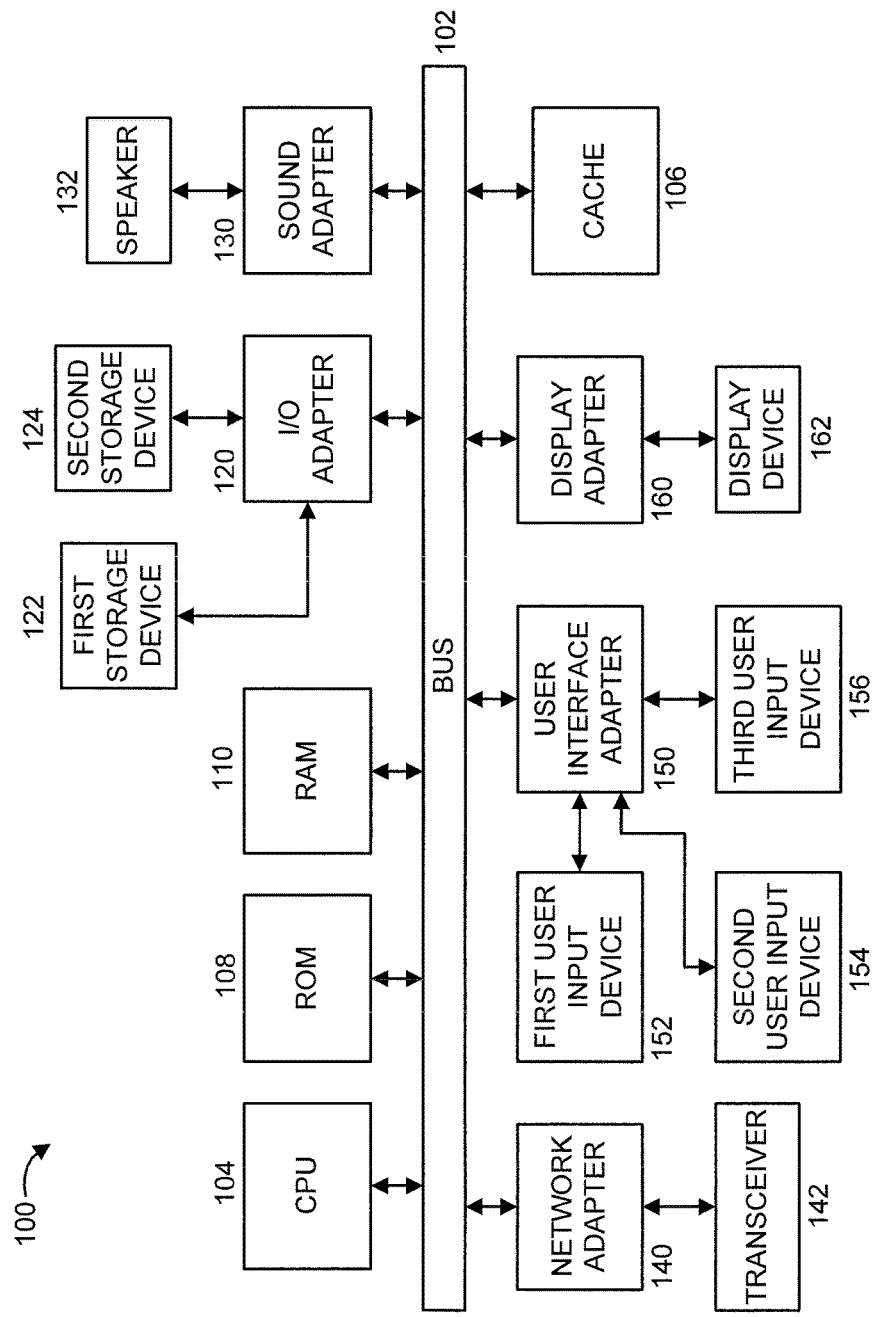
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
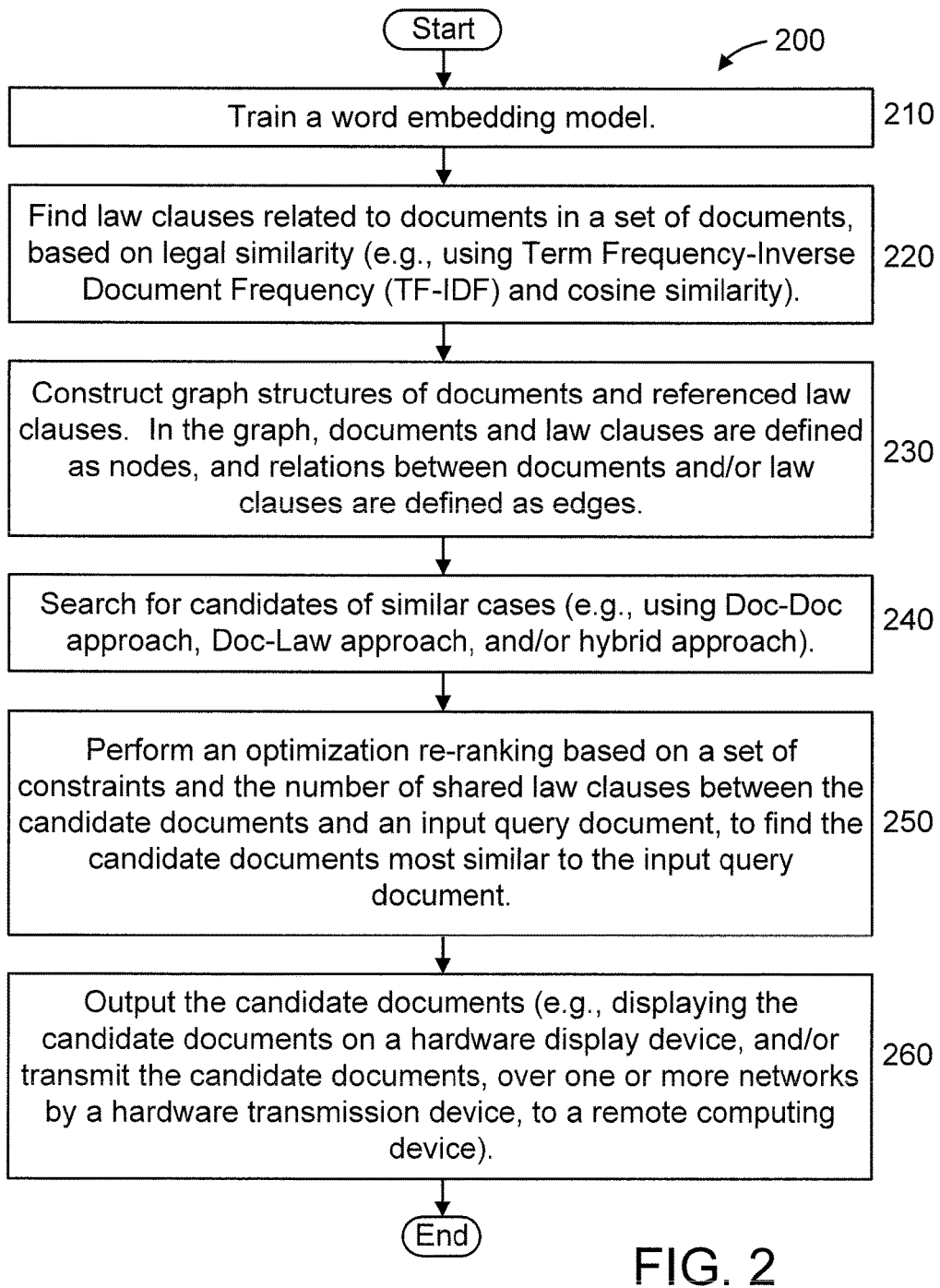
FIG. 2 shows an exemplary system 200 for legal document search based on legal similarity, in accordance with an embodiment of the present principles.

Further, it is to be appreciated that processing system 100 may perform at least part of the method described herein including, for example, at least part of method 200 of FIG. 2.

FIG. 2 shows an exemplary method 200 for performing legal document searches based on legal similarity, in accordance with an embodiment of the present principles.

At step 210, train a word embedding model. In an embodiment, only law clauses are used to train the embedding model, that is, documents are not used to train the embedding model.

In an embodiment, the word embedding model enables the handling of the hypernymy/hyponymy between laws and documents (law clause $\supset$ document). In an embodiment, the word embedding vectors are formed to include only technical (i.e., legal) vocabularies occurring in law clauses.

In an embodiment, a word embedding vector is formed by mapping (legal) words (from the technical vocabulary) (and possibly phrases thereof) to vectors of real numbers in a low dimensional space.

At step 220, find law clauses related to documents in a set of documents, based on legal similarity. In an embodiment, step 220 can be based on the amount of legal involvement implicated by a given document (in the set) to a particular law clause.

In an embodiment, finding the law clauses that are related to the documents can involve, for example, determining the Term Frequency-Inverse Document Frequency (TF-IDF) which is a numerical statistic intended to reflect how important a word is to a document in the set of documents. The words used for TF-IDF can come from the words in the word embedding vectors. The vectors can be formed or modified to be TF-IDF vectors, that is, to include information relating to TF-IDF.

In an embodiment, step 220 can involve representing the documents and law clauses by summation of the word embedding vectors. For example, two word embedding vectors are summed together (e.g., to represent a document—law clause pair) when they are defined as significant content words (e.g., words which have higher TF-IDF scores than a certain threshold.).

In an embodiment, step 220 can include measuring cosine similarity between the summed word embedding vectors. The vectors that are deemed similar to each other, based on cosine similarity, are compared to documents to determine if legal terms from legal clauses, as represented by the vectors, match any terms in the documents. In an embodiment, the most similar N law clauses are defined as the related law clauses for each document. In an embodiment, N=5-10. However, other values for N can also be used in accordance with the teachings of the present principles, while maintaining the spirit of the present principles.

At step 230, construct graph structures of documents and referenced law clauses.

We will now describe exemplary graph structures for the graph constructed at step 230. In an embodiment, documents and law clauses are defined as nodes, and relations between documents and/or law clauses are defined as edges. In an embodiment, documents and law clauses are defined as nodes, and relations (1) between documents and law clauses and (2) between documents are defined as edges. Thus, in an embodiment, each node can include and/or otherwise be associated with a particular document or a particular law clause, and each edge can include and/or otherwise be associated with a particular relation between two documents or a particular relation between a particular document and a particular law clause.

Regarding step 230, in an embodiment, doc-doc (document to document) edges are determined (calculated) by cosine similarity of the vectors, but doc-law (document to law clause) edges are estimated by step 220. In an embodiment, documents are linked to the related laws as edges and the weights of the edges are set by the cosine similarities.

At step 240, search for candidates of similar cases using one or more similarity approaches.

Regarding step 240, the same can involve any number of similarity approaches, either used singly or in any combination. These approaches can be implemented as models. In one approach, referred to as the "Doc-Doc" approach/model, only document similarity is considered/exploited, without considering/exploiting law nodes (and only considering document nodes). In another approach, referred to as the "Doc-Law" approach/model, only document to law edges (i.e., relations between documents and law clauses) are considered/exploited, without considering/exploiting document to document edges (i.e., relations between documents). In yet another approach, referred to as the "hybrid" approach/model, all edge types are considered, namely document to document edges and document to law clause edges.

In an embodiment, step 240 involves performing a graph random walk. In an embodiment, step 240 involves performing a random walk with restart and finding similar document. In an embodiment, step 240 involves performing a random walk on an unsymmetrical graph structure.

At step 250, perform an optimization re-ranking based on a set of constraints and the number of shared law clauses between the candidate documents and an input query document, to find the candidate documents most similar to the input query document.

Regarding step 250, in an embodiment, similar documents share at least one related law clause (legal similarity always requires a law clause as an evidence). In an embodiment, increased sharing indicates increased similarity and vice versa. In an embodiment, an Integer Linear Programming (ILP) solver (e.g., CPLEX®) can be used to solve a constrained optimization problem for the optimization re-ranking.

Still further regarding step 250, the same can involve any number of evaluation approaches, either used singly or in any combination. For example, in an embodiment, the mean reciprocal rank (MRR) can be used for re-ranking candidate documents, wherein MRR=averaged reciprocal numbers of the highest ranking candidate documents. In an embodiment, the mean averaged precision (MAP) can be used for re-ranking candidate documents, wherein $$MAP = \frac{\sum_{q=1}^{Q} AveP(q)}{Q},$$

and wherein "Q" denotes the length of rank list (e.g., 10, 100), "q" denotes the q-th rank, and "AveP(q)" denotes average precision at rank q.

Yet further regarding step 250, in an embodiment, the same can involve using the aforementioned hybrid model to re-rank the candidate documents. Moreover, in an embodiment, the re-ranking is performed using logic constraints. In an embodiment, some exemplary constraints that can be used for the optimization re-ranking include, but are not limited to the constraints of shared law clauses. We can also implement constraints among law clauses. In general, laws have an interdependency. For example, some law clause replace other laws for specific domains, or one law clause is always applied with another. These and other relations and constraints as readily determined by one of ordinary skill in the art given the teachings of the present principles provided herein can be exploited in step 250, while maintaining the spirit of the present principles.

At step 260, output the candidate documents (as re-ranked by step 250). In an embodiment, step 260 involves displaying the candidate documents on a hardware display device. In an embodiment, step 260 involves transmitting the candidate documents, over one or more networks by a hardware transmission device, to a remote computing device. The hardware transmission device can be a transmission server or simply an in-device transmitter such as a wired or wireless transmitter or transceiver.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 3:
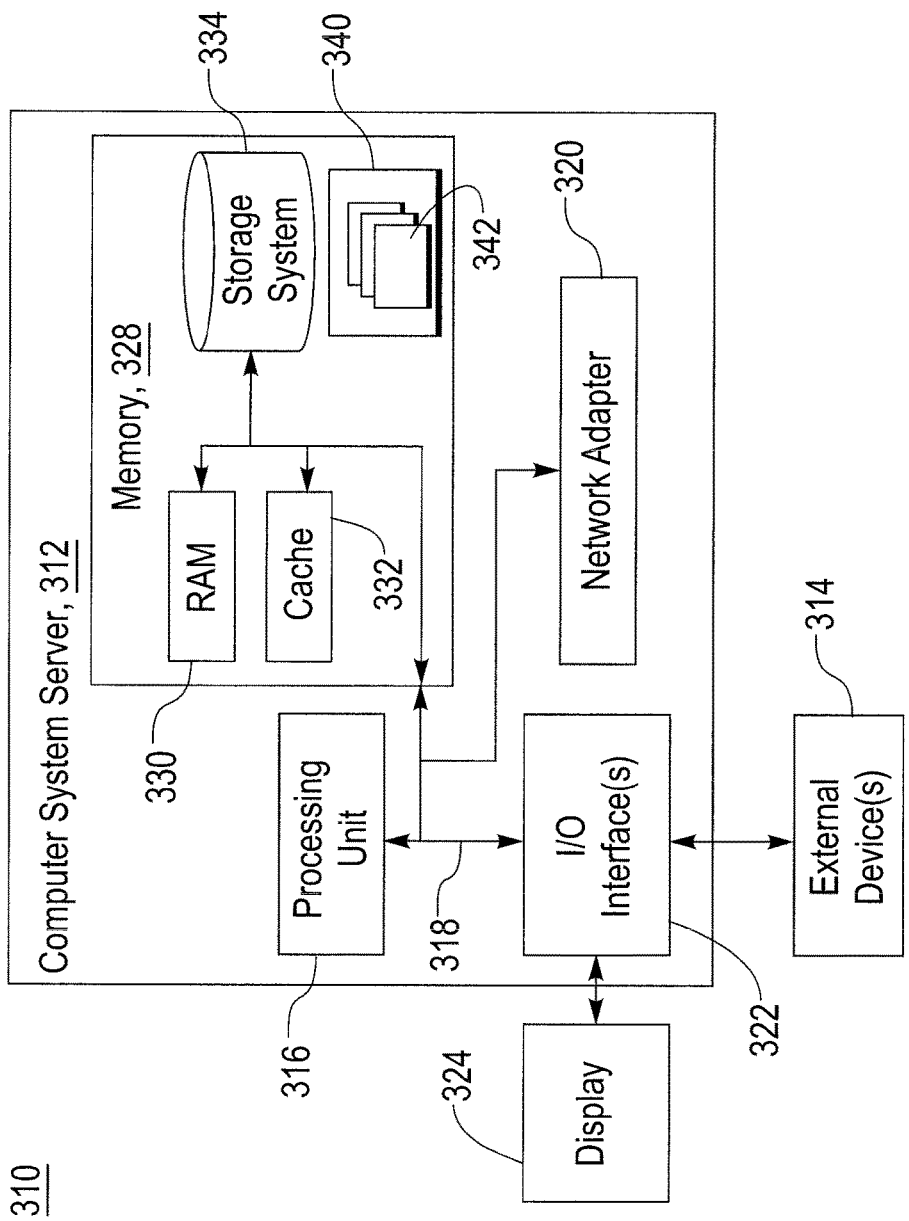
FIG. 3 shows an exemplary cloud computing node 310, in accordance with an embodiment of the present principles.

Referring now to FIG. 3, a schematic of an example of a cloud computing node 310 is shown. Cloud computing node 310 is only one example of a suitable cloud computing node and is not intended to suggest any limitation as to the scope of use or functionality of embodiments of the invention described herein. Regardless, cloud computing node 310 is capable of being implemented and/or performing any of the functionality set forth hereinabove.

In cloud computing node 310 there is a computer system/server 312, which is operational with numerous other general purpose or special purpose computing system environments or configurations. Examples of well-known computing systems, environments, and/or configurations that may be suitable for use with computer system/server 312 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 312 may be described in the general context of computer system executable instructions, such as program modules, being executed by a computer system. Generally, program modules may include routines, programs, objects, components, logic, data structures, and so on that perform particular tasks or implement particular abstract data types. Computer system/server 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 312 in cloud computing node 310 is shown in the form of a general-purpose computing device. The components of computer system/server 312 may include, but are not limited to, one or more processors or processing units 316, a system memory 328, and a bus 318 that couples various system components including system memory 328 to processor 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 312 typically includes a variety of computer system readable media. Such media may be any available media that is accessible by computer system/server 312, and it includes both volatile and non-volatile media, removable and non-removable media.

System memory 328 can include computer system readable media in the form of volatile memory, such as random access memory (RAM) 330 and/or cache memory 332. Computer system/server 312 may further include other removable/non-removable, volatile/non-volatile computer system storage media. By way of example only, storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 428 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein.

Computer system/server 312 may also communicate with one or more external devices 314 such as a keyboard, a pointing device, a display 324, etc.; one or more devices that enable a user to interact with computer system/server 312; and/or any devices (e.g., network card, modem, etc.) that enable computer system/server 312 to communicate with one or more other computing devices. Such communication can occur via Input/Output (I/O) interfaces 322. Still yet, computer system/server 312 can communicate with one or more networks such as a local area network (LAN), a general wide area network (WAN), and/or a public network (e.g., the Internet) via network adapter 320. As depicted, network adapter 320 communicates with the other components of computer system/server 312 via bus 318. It should be understood that although not shown, other hardware and/or software components could be used in conjunction with computer system/server 312. Examples, include, but are not limited to: microcode, device drivers, redundant processing units, external disk drive arrays, RAID systems, tape drives, and data archival storage systems, etc.

Figure 4:
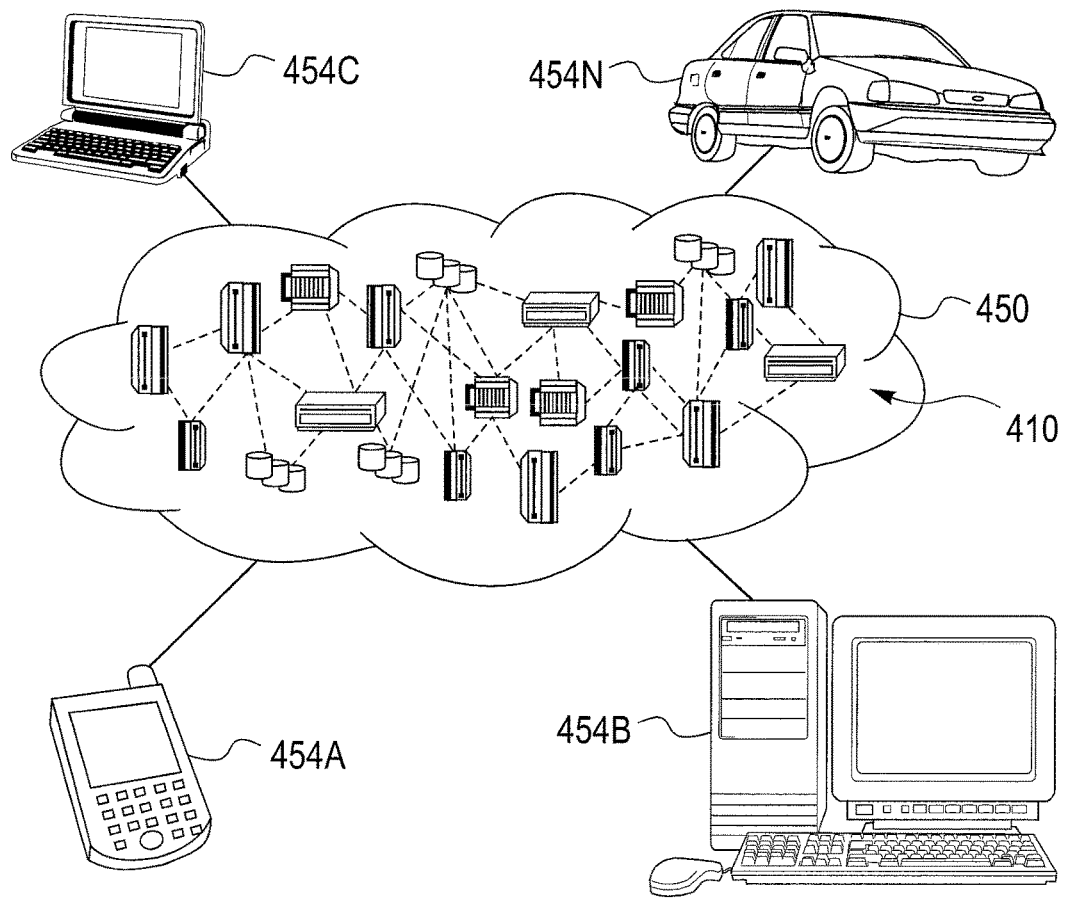
FIG. 4 shows an exemplary cloud computing environment 450, in accordance with an embodiment of the present principles.

Referring now to FIG. 4, illustrative cloud computing environment 450 is depicted. As shown, cloud computing environment 450 comprises one or more cloud computing nodes 410 with which local computing devices used by cloud consumers, such as, for example, personal digital assistant (PDA) or cellular telephone 454A, desktop computer 454B, laptop computer 454C, and/or automobile computer system 454N may communicate. Nodes 410 may communicate with one another. They may be grouped (not shown) physically or virtually, in one or more networks, such as Private, Community, Public, or Hybrid clouds as described hereinabove, or a combination thereof. This allows cloud computing environment 450 to offer infrastructure, platforms and/or software as services for which a cloud consumer does not need to maintain resources on a local computing device. It is understood that the types of computing devices 454A-N shown in FIG. 4 are intended to be illustrative only and that computing nodes 410 and cloud computing environment 450 can communicate with any type of computerized device over any type of network and/or network addressable connection (e.g., using a web browser).

Figure 5:
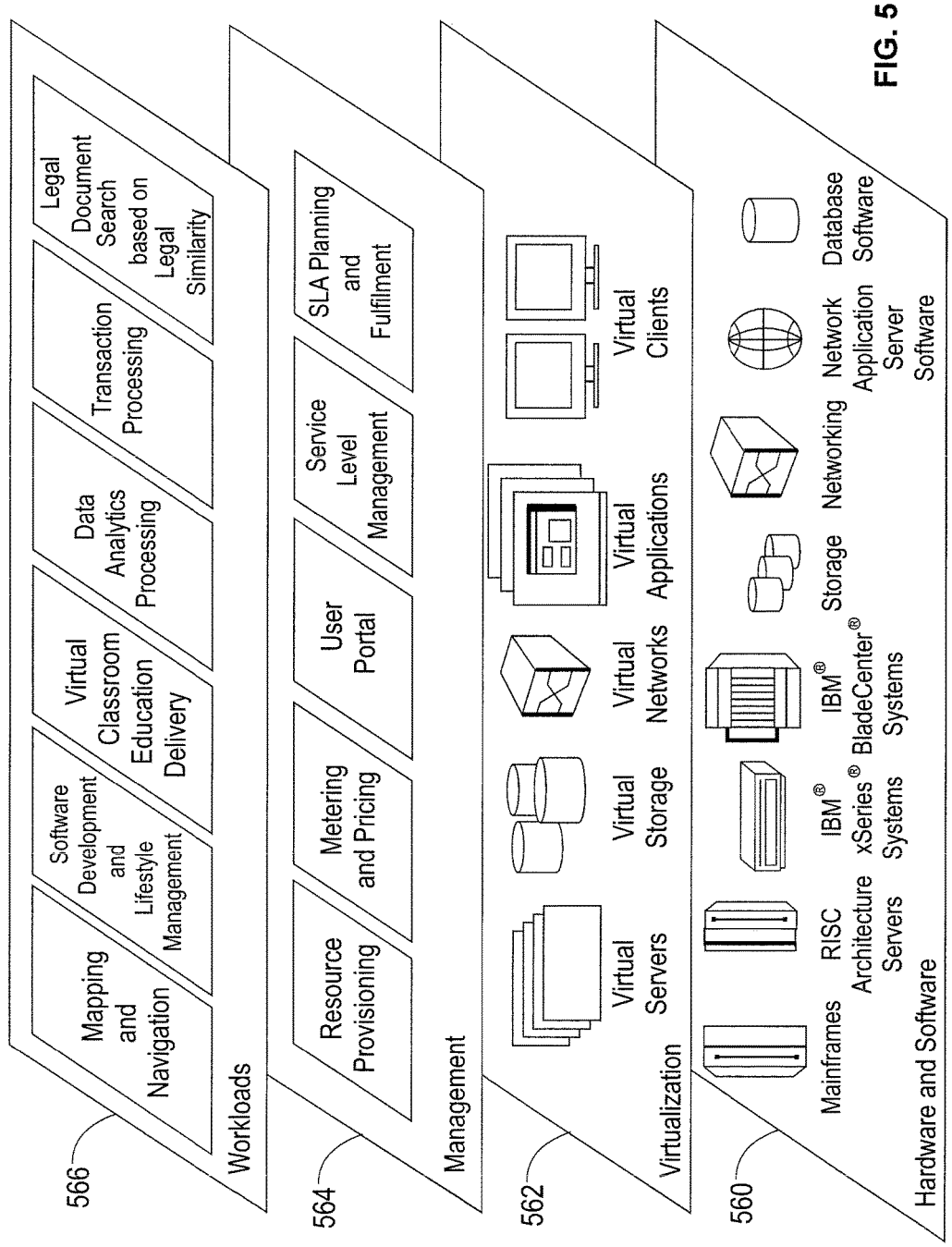
FIG. 5 shows exemplary abstraction model layers, in accordance with an embodiment of the present principles.

Referring now to FIG. 5, a set of functional abstraction layers provided by cloud computing environment 450 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 562 provides an abstraction layer from which the following examples of virtual entities may be provided: virtual servers; virtual storage; virtual networks, including virtual private networks; virtual applications and operating systems; and virtual clients.

In one example, management layer 564 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 566 provides examples of functionality for which the cloud computing environment may be utilized. Examples of workloads and functions which may be provided from this layer include: mapping and navigation; software development and lifecycle management; virtual classroom education delivery; data analytics processing; transaction processing; and legal document search based on legal similarity.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for performing a legal document search, the method comprising:
   finding, by a processor, for each of a plurality of documents based on a legal similarity, a respective law clause related thereto, to obtain a plurality of related law clauses;
   constructing, by the processor, a graph having nodes defined by the plurality of documents and the plurality of related law clauses and having edges defined by (1) relations between the plurality of documents and the plurality of related law clauses and (2) relations between the plurality of documents; and
   identifying, by the processor, from the plurality of documents, one or more candidate documents that are similar to an input query document by mining the graph using similarity criteria;
   wherein the graph is mined using an approach that considers both (1) the relations between the plurality of documents and the plurality of related law clauses and (2) the relations between the plurality of documents.

2. The method of claim 1, wherein said finding step comprises determining a respective confidence score for each pairing of a given one of the plurality of documents and the respective law clause related thereto, the respective confidence score serving as a ranking for the given one of the plurality of documents with respect to the respective law clause related thereto.

3. The method of claim 2, wherein the one or more candidate documents comprise a plurality of candidate documents, and the method further comprises re-ranking the plurality of candidate documents based on a number of the plurality of related law clauses that occur in both the plurality of candidate documents and the input query document.

4. The method of claim 3, wherein said re-ranking step re-ranks the plurality of candidate documents using at least one of a mean reciprocal rank and a mean averaged precision.

5. The method of claim 3, wherein the re-ranking step re-ranks the plurality of documents using an Integer Linear Programming (ILP) solver.

6. The method of claim 1, wherein said finding step comprises:
  representing law clause and document combinations as respective vectors; and
  measuring a cosine similarity between the respective vectors to identify the respective law clause for the each of the documents with a respective confidence score.

7. The method of claim 6, wherein the vectors are Term Frequency-Inverse Document Frequency vectors.

8. The method of claim 6, further comprising training a word embedding model using only law clauses and omitting documents, wherein the respective vectors are formed using the word embedding model.

9. The method of claim 1, wherein said identifying step comprises displaying, on a hardware display device, the one or more candidate documents.

10. The method of claim 1, wherein said identifying step comprises transmitting, over one or more networks by a hardware transmission device, the one or more candidate documents to a remote computing device.

11. The method of claim 1, wherein the graph is mined using a random walk path formulation.

12. The method of claim 11, wherein the random walk path formulation includes a restart component.

13. The method of claim 11, wherein the random walk path formulation includes indirect relations between the plurality of related law clauses and the plurality of documents.

14. The method of claim 1, wherein the graph is mined using an approach that considers only the nodes defined by the plurality of documents while omitting the nodes defined by the plurality of related law clauses.

15. The method of claim 1, wherein the graph is mined using an approach that considers only (1) the relations between the plurality of documents and the plurality of related law clauses while omitting (2) the relations between the plurality of documents.

16. A computer program product for performing a legal document search, the computer program product comprising a computer readable storage medium having program instructions embodied therewith, the program instructions executable by a computer to cause the computer to perform a method comprising:
  finding, by a processor, for each of a plurality of documents based on a legal similarity, a respective law clause related thereto, to obtain a plurality of related law clauses;
  constructing, by the processor, a graph having nodes defined by the plurality of documents and the plurality of related law clauses and having edges defined by relations between (1) the plurality of documents and the plurality of related law clauses and (2) the plurality of documents; and
  identifying, by the processor, from the plurality of documents, one or more candidate documents that are similar to an input query document by mining the graph using similarity criteria;
  wherein the graph is mined using an approach that considers both (1) the relations between the plurality of documents and the plurality of related law clauses and (2) the relations between the plurality of documents.

17. The computer program product of claim 16, wherein the processor determines a respective confidence score for each pairing of a given one of the plurality of documents and the respective law clause related thereto, the respective confidence score serving as a ranking for the given one of the plurality of documents with respect to the respective law clause related thereto.

18. The computer program product of claim 17, wherein the one or more candidate documents comprise a plurality of candidate documents, and the processor re-ranks the plurality of candidate documents based on a number of the plurality of related law clauses that occur in both the plurality of candidate documents and the input query document.

19. A system for performing a legal document search, the system comprising:
  a hardware processor and a memory device, configured to:
    find, for each of a plurality of documents based on a legal similarity, a respective law clause related thereto, to obtain a plurality of related law clauses;
    construct a graph having nodes defined by the plurality of documents and the plurality of related law clauses and having edges defined by (1) relations between the plurality of documents and the plurality of related law clauses and (2) relations between the plurality of documents; and
    identify, from the plurality of documents, one or more candidate documents that are similar to an input query document by mining the graph using similarity criteria;
    wherein the graph is mined using an approach that considers both (1) the relations between the plurality of documents and the plurality of related law clauses and (2) the relations between the plurality of documents; and
  a transmission server for transmitting, over one or more networks, the one or more candidate documents to a remote computing device.

* * * * *